(12) United States Patent
An et al.

(10) Patent No.: US 10,054,793 B2
(45) Date of Patent: Aug. 21, 2018

(54) HOLOGRAPHIC DISPLAY APPARATUS AND HOLOGRAPHIC DISPLAY METHOD

(71) Applicant: SAMSUNG ELECTRONICS CO., LTD., Suwon-si (KR)

(72) Inventors: Jungkwuen An, Cheonan-si (KR); Geeyoung Sung, Daegu (KR); Sunil Kim, Seoul (KR); Hongseok Lee, Seongnam-si (KR); Chilsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 297 days.

(21) Appl. No.: 14/881,671

(22) Filed: Oct. 13, 2015

(65) Prior Publication Data
US 2016/0103321 A1 Apr. 14, 2016

(30) Foreign Application Priority Data

Oct. 10, 2014 (KR) .................. 10-2014-0136959
Sep. 8, 2015 (KR) .................. 10-2015-0127036

(51) Int. Cl.
*H04N 13/02* (2006.01)
*G02B 27/01* (2006.01)
(Continued)

(52) U.S. Cl.
CPC ..... *G02B 27/0103* (2013.01); *G02B 27/0093* (2013.01); *G02B 27/225* (2013.01);
(Continued)

(58) Field of Classification Search
CPC ......... G03H 1/2294; G03H 2001/0825; G03H 2001/2242; G03H 2001/2297;
(Continued)

(56) References Cited

U.S. PATENT DOCUMENTS 6,407,724 B2   6/2002   Waldern et al.
7,595,923 B2   9/2009   Gabor et al.
(Continued)

FOREIGN PATENT DOCUMENTS

DE   102009044910 A1   12/2010
JP      4813475 B2      11/2011
(Continued)

*Primary Examiner* — Sathyanaraya V Perungavoor
*Assistant Examiner* — Peet Dhillon
(74) *Attorney, Agent, or Firm* — Sughrue Mion, PLLC

(57) ABSTRACT

A holographic display apparatus includes a spatial light modulator configured to generate hologram patterns to modulate light; an illuminator configured to emit the light to the spatial light modulator; and a controller configured to control operations of the spatial light modulator and the illuminator, the spatial light modulator being configured to generate, from among the hologram patterns, a first hologram pattern and a second hologram pattern according to the control operations of the controller, the first hologram pattern and the second hologram pattern being configured to form a first hologram image and a second hologram image having different viewpoints, and the controller being configured to set a first phase modulation value of the first hologram pattern and a second phase modulation value of the second hologram pattern to be different from each other such that hologram images having different viewpoints are formed.

25 Claims, 17 Drawing Sheets

(51) Int. Cl.
*G03H 1/22* (2006.01)
*G02B 27/00* (2006.01)
*G02B 27/22* (2018.01)
*G03H 1/08* (2006.01)

(52) U.S. Cl.
CPC ... *G03H 1/2294* (2013.01); *G02B 2027/0134* (2013.01); *G03H 2001/0825* (2013.01); *G03H 2001/2242* (2013.01); *G03H 2001/2297* (2013.01); *G03H 2222/34* (2013.01); *G03H 2226/05* (2013.01)

(58) Field of Classification Search
CPC .......... G03H 2222/34; G03H 2226/05; G02B 27/225; G02B 27/0103; G02B 27/0093; G02B 2027/0134
See application file for complete search history.

(56) References Cited

U.S. PATENT DOCUMENTS

| | | | |
|---|---|---|---|
| 7,636,184 B2 | 12/2009 | Schwerdtner | |
| 7,969,633 B2 | 6/2011 | Schwerdtner | |
| 8,085,217 B2 | 12/2011 | Slavenburg et al. | |
| 8,218,211 B2 | 7/2012 | Kroll et al. | |
| 2010/0033781 A1 | 2/2010 | Leister | |
| 2010/0195178 A1 | 8/2010 | Leister et al. | |
| 2010/0289870 A1 | 11/2010 | Leister | |
| 2011/0285700 A1 | 11/2011 | Kim et al. | |
| 2012/0176665 A1 | 7/2012 | Song et al. | |
| 2013/0335795 A1 | 12/2013 | Song et al. | |
| 2014/0055692 A1 | 2/2014 | Kroll et al. | |
| 2014/0210960 A1 | 7/2014 | Sung et al. | |
| 2014/0285862 A1 | 9/2014 | Song et al. | |
| 2015/0036199 A1* | 2/2015 | Leister | G03H 1/2294 359/9 |
| 2015/0346491 A1* | 12/2015 | Christmas | G03H 1/0808 359/9 |
| 2016/0041524 A1 | 2/2016 | Song et al. | |

FOREIGN PATENT DOCUMENTS

KR   101073512 B1   10/2011
WO   2004051323 A1   6/2004

* cited by examiner

HOLOGRAPHIC DISPLAY APPARATUS AND HOLOGRAPHIC DISPLAY METHOD

CROSS-REFERENCE TO RELATED APPLICATION

This application claims priority to Korean Patent Application No. 10-2014-0136959, filed on Oct. 10, 2014, and Korean Patent Application No. 10-2015-0127036, filed on Sep. 8, 2015, in the Korean Intellectual Property Office, the disclosure of which is incorporated herein in its entirety by reference.

BACKGROUND

1. Field

The exemplary embodiments disclosed in the present disclosure relate to a holographic display apparatus and a holographic display method, and more particularly, to a holographic display apparatus and a holographic display method capable of preventing binocular crosstalk while providing hologram images having different viewpoints to the left and right eyes of an observer.

2. Description of the Related Art

As methods of realizing 3D images, methods which use glasses (also referred to as "glasses methods") and methods which do not use glasses (also referred to as "non-glasses methods") are widely used. Examples of the glasses methods include deflected glasses methods and shutter glasses methods, and examples of the non-glasses methods include lenticular methods and parallax barrier methods. Such methods use binocular parallax and are limited in increasing the number of viewpoints. In addition to this, these methods make viewers feel tired due to the difference between the depth of images, which the brain perceives, and the focus of the eyes.

Recently, holographic display methods, which are 3D image display methods capable of making the depth, which the brain perceives, consistent with the focus of the eyes and providing full parallax, have been gradually put to practical use. A holographic display technique uses a principle that once reference light is irradiated onto a hologram pattern having recorded thereon an interference pattern obtained by interference between object light reflected from an original object and the reference light, the reference light is diffracted, and an image of the original object is reproduced. A currently commercialized holographic display technique provides a computer-generated hologram (CGH), rather than the hologram pattern obtained by directly exposing the original object to light, as an electric signal to a spatial light modulator. The spatial light modulator forms the hologram pattern and diffracts incident light according to the input CGH signal, thereby generating a 3D image.

However, a very high resolution spatial light modulator and a very large amount of data processing are required to implement a perfect holographic display technique. Recently, to reduce the amount of data processing required to be performed while still achieving a sufficient resolution, a binocular hologram technique of providing hologram images to only a viewing zone corresponding to both eyes of the observer has been proposed. For example, a hologram image having a viewpoint corresponding to a left-eye viewing zone of the observer and a hologram image having a viewpoint corresponding to a right-eye viewing zone of the observer are generated and provided to the left and right eyes of the observer, respectively. In this case, no hologram image for other viewpoints is generated, and thus, a data processing amount may be greatly reduced, and a currently commercialized display apparatus may satisfy a resolution condition of the spatial light modulator.

SUMMARY

According to an aspect of an exemplary embodiment, there is provided a holographic display apparatus including: a spatial light modulator configured to generate hologram patterns to modulate light; an illuminator configured to emit the light to the spatial light modulator; and a controller configured to control operations of the spatial light modulator and the illuminator, wherein the spatial light modulator is configured to generate, from among the hologram patterns, a first hologram pattern and a second hologram pattern according to the control operations of the controller, the first hologram pattern and the second hologram pattern being configured to form a first hologram image and a second hologram image having different viewpoints, and wherein the controller is configured to set a first phase modulation value of the first hologram pattern and a second phase modulation value of the second hologram pattern to be different from each other such that hologram images having different viewpoints formed by the first hologram pattern and the second hologram pattern are formed on different spatial locations.

The controller may be configured to control the spatial light modulator to alternately scan the first hologram pattern and the second hologram pattern in a progressive scanning way in order to alternately form the first hologram image and the second hologram image in a time division way.

The spatial light modulator may be configured to display the first hologram pattern on a first frame, the second hologram pattern on a second frame that is subsequent to the first frame, a part of the first hologram pattern on a partial area of the spatial light modulator, and a part of the second hologram pattern on a remaining partial area of the spatial light modulator during a transition period between the first frame and the second frame.

The controller may be configured to set the first phase modulation value such that the first hologram image modulated and formed by the first hologram pattern is transmitted to a first viewing zone and to set the second phase modulation value such that the second hologram image modulated and formed by the second hologram pattern is transmitted to a second viewing zone different from the first viewing zone during the transition period.

The controller may be configured to control the spatial light modulator to overlap and display the first hologram pattern and the second hologram pattern on one frame.

The controller may be configured to set the first phase modulation value such that the first hologram image formed by the first hologram pattern among the overlapped first hologram pattern and second hologram pattern is transmitted to a first viewing zone and set the second phase modulation value such that the second hologram image modulated and formed by the second hologram pattern is transmitted to a second viewing zone different from the first viewing zone.

The illuminator may include one light source configured to emit light.

The controller may be configured to set the first phase modulation value such that the first hologram image formed by modulating light emitted by the light source by using the first hologram pattern is incident to a first viewing zone, and to set the second phase modulation value such that the second hologram image formed by modulating the light emitted by the light source by using the second hologram pattern is incident to a second viewing zone different from the first viewing zone.

The illuminator may include a first light source configured to emit light for forming the first hologram image and a second light source configured to emit light for forming the second hologram image.

The controller may be configured to set the first phase modulation value such that the first hologram image formed by modulating light emitted by the first light source by using a first hologram pattern is incident to a first viewing zone, and a third hologram image formed by modulating light emitted by the second light source by using the first hologram pattern is incident to a location beyond a second viewing zone.

The controller may be configured to set the second phase modulation value such that the second hologram image formed by modulating the light emitted by the second light source by using a second hologram pattern is incident to the second viewing zone, and a fourth hologram image formed by modulating the light emitted by the first light source by using the second hologram pattern is incident to a location beyond the first viewing zone.

The holographic display apparatus may further include an eye tracker configured to track a pupil location of an observer observing the first hologram image, the second hologram image, the third hologram image and the fourth hologram image, wherein the controller may be configured to change the first phase modulation value and the second phase modulation value such that a location difference between the first hologram image and the fourth hologram image and a location difference between the second hologram image and the third hologram image are maintained to be greater than sizes of the pupils of the observer in response to a pupil location change of the observer.

The first light source and the second light source may be configured to simultaneously provide light to the spatial light modulator.

The first hologram pattern may be represented as a product of hologram data of the first hologram image multiplied with the first phase modulation value, and the second hologram pattern may be represented as a product of hologram data of the second hologram image multiplied with the second phase modulation value.

According to an aspect of another exemplary embodiment, there is provided a holographic display apparatus including: a spatial light modulator configured to generate hologram patterns to modulate incident light; an illuminator configured to emit light to the spatial light modulator; and a controller configured to control the spatial light modulator and the illuminator, wherein the spatial light modulator is configured to simultaneously generate, from among the hologram patterns, a first hologram pattern that modulates the incident light as a first hologram image and a second hologram pattern that modulates the incident light as a second hologram image, and wherein the controller is configured to set a first phase modulation value of the first hologram pattern and a second phase modulation value of the second hologram pattern to be different from each other such that a location difference between the first hologram image and the second hologram image is maintained to be greater than sizes of pupils of an observer observing the first hologram image and the second hologram image.

The illuminator may include one light source configured to emit light.

The controller may be configured to set the first phase modulation value such that the first hologram image formed by modulating the light emitted by the light source by using the first hologram pattern is incident to a first viewing zone, and to set the second phase modulation value such that the second hologram image formed by modulating the light emitted by the light source by using the second hologram pattern is incident to a second viewing zone different from the first viewing zone.

The illuminator may include a first light source configured to emit light for forming the first hologram image and a second light source configured to emit light for forming the second hologram image.

The controller may be configured to set the first phase modulation value such that the first hologram image formed by modulating the light emitted by the first light source by using a first hologram pattern is incident to a first viewing zone, and a third hologram image formed by modulating the light emitted by the second light source by using the first hologram pattern is incident to a location beyond a second viewing zone.

The controller may be configured to set the second phase modulation value such that the second hologram image formed by modulating the light emitted by the second light source unit by using a second hologram pattern is incident to the second viewing zone, and a fourth hologram image formed by modulating the light emitted by the first light source by using the second hologram pattern is incident to a location beyond the first viewing zone.

The controller may be configured to set the first phase modulation value and the second phase modulation value such that a location difference between the first hologram image and the fourth hologram image and a location difference between the second hologram image and the third hologram image are maintained to be greater than sizes of the pupils of an observer.

According to an aspect of another exemplary embodiment, there is provided a holographic display method comprising: emitting light to a spatial light modulator; and simultaneously forming, by the spatial light modulator, a first hologram pattern that modulates the light as a first hologram image and a second hologram pattern that modulates the light as a second hologram image, wherein the simultaneously forming comprises setting a first phase modulation value of the first hologram pattern and a second phase modulation value of the second hologram pattern to be different from each other such that a location difference between the first hologram image and the second hologram image is maintained to be greater than sizes of pupils of an observer observing the first hologram image and the second hologram image.

The emitting of the light to the spatial light modulator may include emitting the light using one light source, and the simultaneously forming may include setting the first phase modulation value such that the first hologram image formed by modulating the light emitted by the light source by using the first hologram pattern is incident to a first viewing zone, and setting the second phase modulation value such that the second hologram image formed by modulating the light emitted by the light source by using the second hologram pattern is incident to a second viewing zone different from the first viewing zone.

The emitting of the light to the spatial light modulator may include emitting the light using a first light source which emits light for forming the first hologram image and a second light source which emits light for forming the second hologram image, and the simultaneously forming may include setting the first phase modulation value such that the first hologram image formed by modulating the light emitted by the first light source by using a first hologram pattern is incident to a first viewing zone, and a third hologram image formed by modulating the light emitted by the second light source by using the first hologram pattern is incident to a location beyond a second viewing zone.

The simultaneously forming may include setting the second phase modulation value such that the second hologram image formed by modulating the light emitted by the second light source by using a second hologram pattern is incident to the second viewing zone, and a fourth hologram image formed by modulating the light emitted by the first light source unit by using the second hologram pattern is incident to a location beyond the first viewing zone.

The simultaneously forming may include setting the first phase modulation value and the second phase modulation value such that a location difference between the first hologram image and the fourth hologram image and a location difference between the second hologram image and the third hologram image are maintained to be greater than sizes of the pupils of an observer.

The first hologram pattern may be represented as a product of hologram data of the first hologram image multiplied with the first phase modulation value, and the second hologram pattern may be represented as a product of hologram data of the second hologram image m the second phase modulation value.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
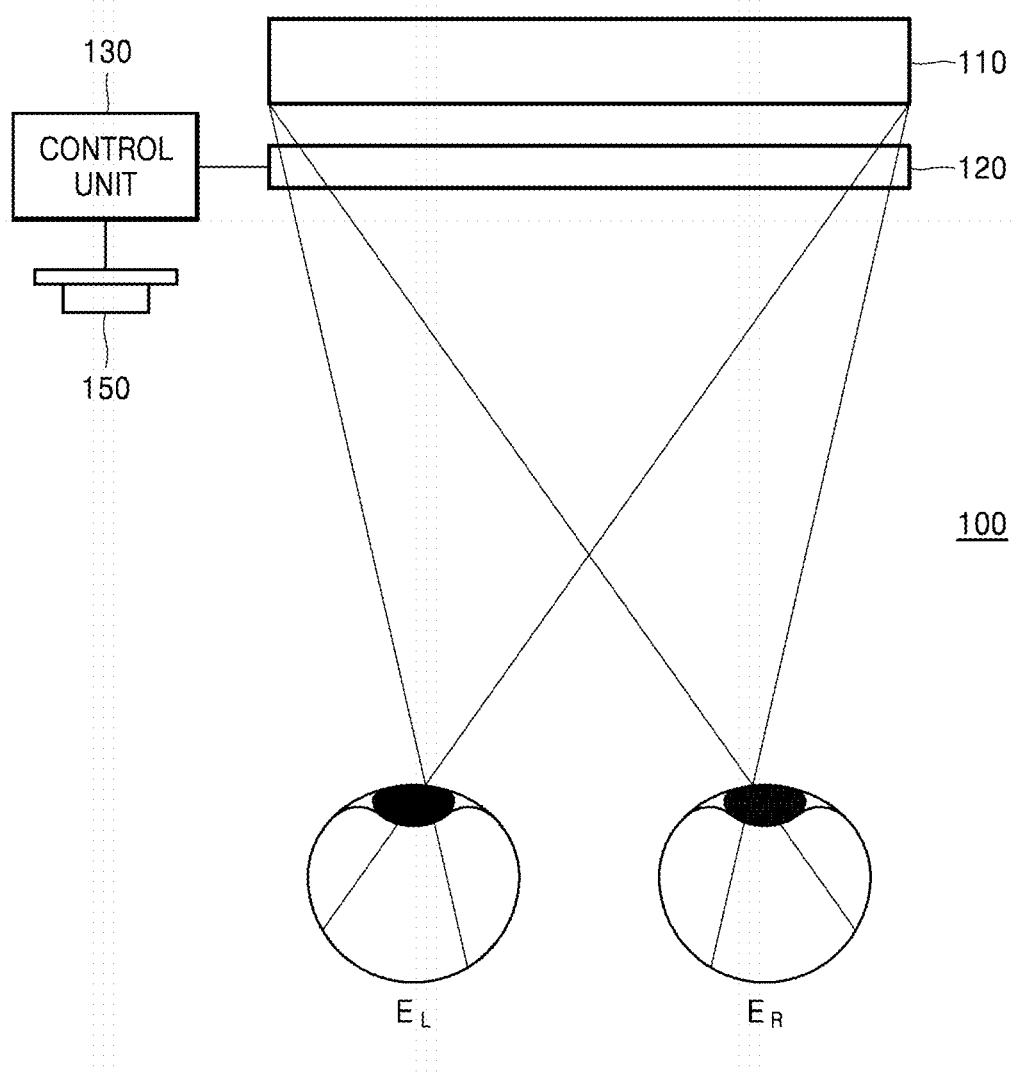
FIG. 1 is a conceptual diagram schematically showing a structure of a holographic display apparatus according to an exemplary embodiment.

Hereinafter, with reference to the accompanying drawings, a holographic display apparatus and method will be described in detail. Like reference numerals refer to like elements throughout, and in the drawings, sizes of elements may be exaggerated for clarity and convenience of explanation. The exemplary embodiments described below are merely exemplary, and various modifications may be possible from the exemplary embodiments. In a layer structure described below, an expression "above" or "on" may include not only "immediately on in a contact manner" but also "on in a non-contact manner". As used herein, the term "and/or" includes any and all combinations of one or more of the associated listed items.

FIG. 1 is a conceptual diagram schematically showing a structure of a holographic display apparatus 100 according to an exemplary embodiment. The holographic display apparatus 100 according to an exemplary embodiment may include a spatial light modulator 120 forming a hologram pattern for modulating incident light, an illumination unit 110 (e.g., illuminator) providing the incident light to the spatial light modulator 120, and a control unit 130 (e.g., controller) controlling operations of the spatial light modulator 120 and the illumination unit 110. The holographic display apparatus 100 may further include an eye tracking unit 150 (e.g., eye tracker) tracking a pupil location of an observer.

The illumination unit 110 may include one light source unit providing collimated light in the spatial light modulator 120. Although not shown, the illumination unit 110 may further include a collimating optical element for collimating light. Alternatively, the illumination unit 110 may use a light source emitting collimated light. The light emitted from the illumination unit 110 may be perpendicularly incident to the spatial light modulator 120. To provide light having a high spatial coherence, the illumination unit 110 may include a laser as a light source. However, if light has a certain degree of spatial coherence, since the incident light may be sufficiently diffracted and modulated by the spatial light modulator 120, a light-emitting diode (LED) may be used as the light source. In addition to the LED, any other light sources may be used as long as light having spatial coherence is emitted. Although not shown in detail, one light source unit of the illumination unit 110 may be configured as an array of a plurality of light sources.

The spatial light modulator 120 may form a hologram pattern for diffracting and modulating the incident light, according to a hologram signal provided by the control unit 130. The light spatial modulator 120 may use any one of a phase modulator for performing phase modulation, an amplitude modulator for performing amplitude modulation, and a complex modulator performing both phase modulation and amplitude modulation. Although the spatial light modulator 120 of FIG. 1 is a transmissive spatial light modulator, a reflective spatial light modulator may also be used. The transmissive light spatial modulator may use, for example, a semiconductor modulator based on a compound semiconductor such as GaAs, or a liquid crystal device (LCD). The reflective spatial light modulator may use, for example, a digital micromirror device (DMD), a liquid crystal on silicon (LCoS), or a semiconductor modulator.

The control unit 130 may be configured to generate the hologram signal according to the hologram image that is to be provided to the observer, provide the hologram signal to the spatial light modulator 120, and control an operation of the illumination unit 110. For example, the control unit 130 may turn on or off the illumination unit 110. The control unit 130 may be implemented by using software or a semiconductor chip functioning as the software.

The eye tracking unit 150 may obtain an image of the observer through a camera, detect the pupils of the observer from the image, and analyze the locations of the pupils. The eye tracking unit 150 may track a pupil location change of the observer and provide the pupil location change to the control unit 130.

The holographic display apparatus 100 having the structure described above may provide hologram images having different viewpoints to the left eye EL and the right eye ER of the observer in a binocular holographic way. For example, the holographic display apparatus 100 may provide a first hologram image to a left eye EL viewing zone of the observer and a second hologram image to a right eye ER viewing zone having a different viewpoint from that of the first hologram image while determining locations of the left eye EL and the right eye ER of the observer by using the eye tracking unit 150. To this end, the spatial light modulator 120 may form a first hologram pattern for the first hologram image and a second hologram pattern for the second hologram image according to control of the control unit 130.

Figure 2A:
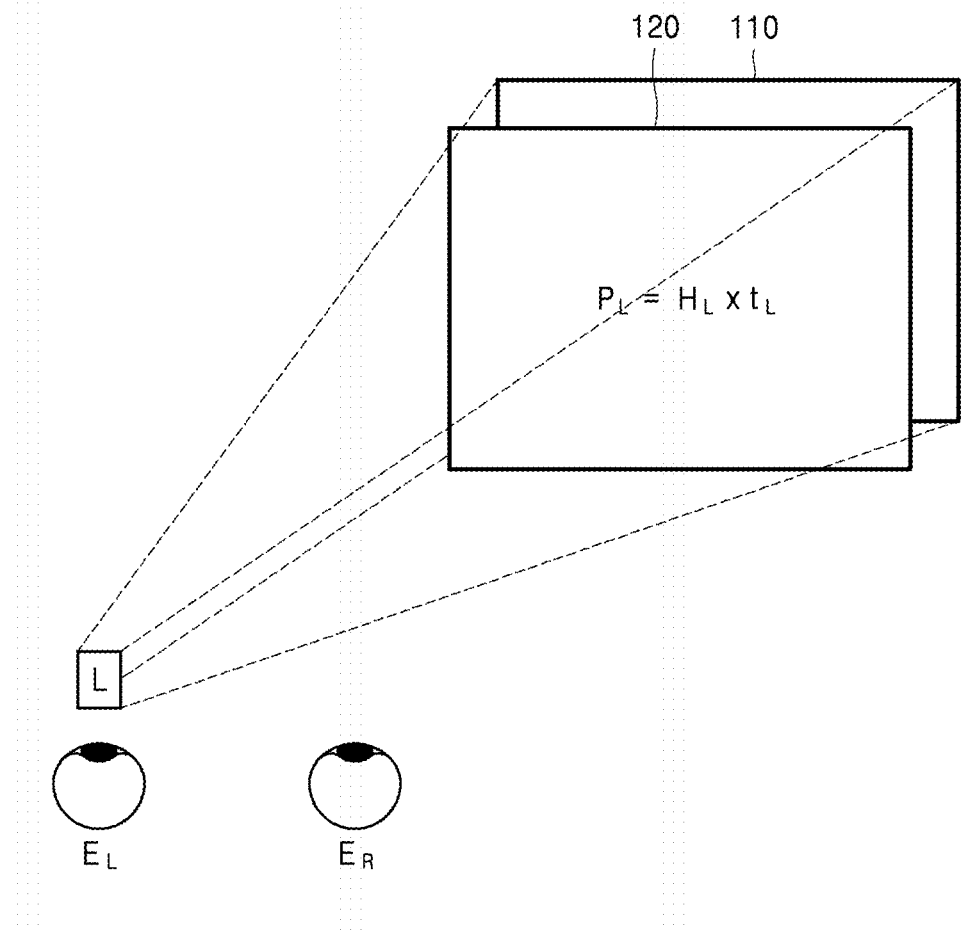
FIGS. 2A and 2B are exemplary diagrams of operations of the holographic display apparatus providing hologram images having different viewpoints to the left and right eyes of an observer in a time divisional way.
Figure 2B:
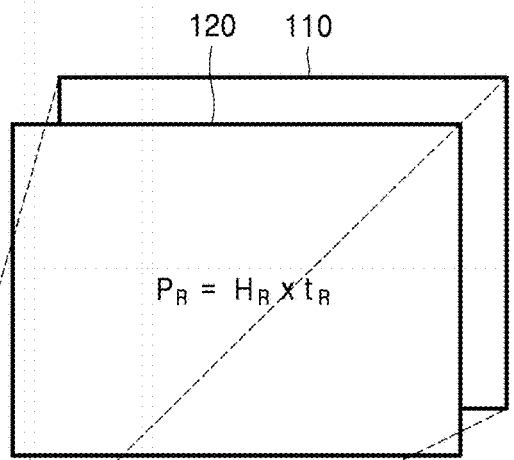

For example, FIGS. 2A and 2B are exemplary diagrams of operations of the holographic display apparatus 100 providing hologram images having different viewpoints to the left eye EL and the right eye ER of an observer in a time divisional way.

Referring to FIG. 2A, the spatial light modulator 120 forms a first hologram pattern PL according to a hologram signal provided by the control unit 130 at a first time. The illumination unit 110 provides light to the spatial light modulator 120. Then, light incident to the spatial light modulator 120 is diffracted and modulated by the first hologram pattern PL, and thus, object light may be reproduced. The object light may be projected to a left eye EL viewing zone of the observer, and thus, a first hologram image L may be formed. Thus, the first hologram image L may be seen by the left eye EL of the observer at the first time.

To form the first hologram image L in the left eye EL viewing zone of the observer by exactly projecting the object light to the left eye EL viewing zone of the observer, a phase modulation transfer function may be used according to Equation 1 below.

$$t_A(x,y) = \exp[jk(x \cos\theta + y \sin\theta)\tan\alpha]$$ [Equation 1]

In Equation 1 above, it is assumed that the spatial light modulator 120 is placed on an x-y plane. $\alpha$ denotes an angle between the incident light and the object light. $\theta$ denotes an orientation angle of the object light on the x-y plane.

The first hologram pattern PL may be expressed as a multiplication HL×tL of a phase modulation value tL of the phase modulation transfer function of Equation 1 above and hologram data HL of the first hologram image L. The hologram data may be previously generated according to an image that is to be reproduced, for example, computer generated hologram (CGH) data. That is, the hologram data may include information regarding the image that is to be reproduced, and the phase modulation value may include information regarding a location from which the reproduced image is to be projected on a space. Thus, the first hologram pattern PL may include both the information regarding the image that is to be reproduced and the information regarding the location from which the reproduced image is to be projected. The phase modulation value may be established to allow the first hologram image L formed by modulating the light emitted from the illumination unit 110 with the first hologram pattern PL incident to the left eye EL viewing zone of the observer. For example, the control unit 130 may calculate the phase modulation value by determining $\alpha$ and $\theta$ values according to a pupil location of the left eye EL of the observer, which is provided by the eye tracking unit 150. The control unit 130 may generate the hologram signal by multiplying the phase modulation value and the CGH data of the image and provide the hologram signal to the spatial light modulator 120. The spatial light modulator 120 may form the first hologram pattern PL represented as a multiplication of the phase modulation value and the hologram data according to the hologram signal. Then, the first hologram image L may be formed in the left eye EL viewing zone of the observer according to the phase modulation value of the first hologram pattern PL.

Referring to FIG. 2B, the spatial light modulator 120 forms a second hologram pattern PR=HR×tR according to the hologram signal provided by the control unit 130 at a second time. The illumination unit 110 provides the light to the spatial light modulator 120. Then, the light incident to the spatial light modulator 120 is diffracted and modulated by the second hologram pattern PR and thus object light may be reproduced. The object light may be projected to a right eye ER viewing zone of the observer, and thus, a second hologram image R may be formed. Thus, the second hologram image R may be seen by the right eye ER of the observer at the second time.

As described above, to form the second hologram image R in the right eye ER viewing zone of the observer by exactly projecting the object light to the right eye ER viewing zone of the observer, the phase modulation transfer function may be used according to Equation 1 above. For example, the control unit 130 may calculate a phase modulation value by determining α and θ values according to a pupil location of the right eye ER of the observer, which is provided by the eye tracking unit 150. The control unit 130 may generate a hologram signal by multiplying a phase modulation value and CGH data of an image and provide the hologram signal to the spatial light modulator 120. The spatial light modulator 120 may form the second hologram pattern PR represented as a multiplication of the phase modulation value and the hologram data according to the hologram signal. Then, the second hologram image R may be formed in the right eye ER viewing zone of the observer according to the phase modulation value of the second hologram pattern PR.

Figure 3:
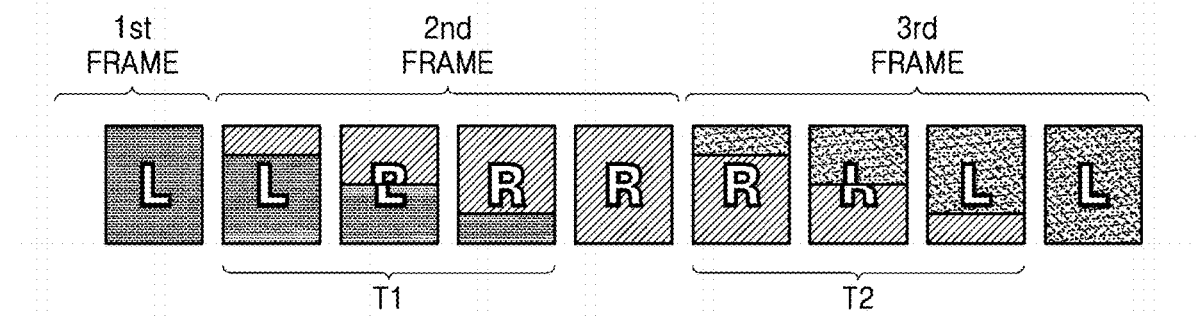
FIG. 3 is an exemplary diagram of a process in which a spatial light modulator scans hologram patterns in a progressive scan way when providing hologram images in a time divisional way.

In a time division method, the spatial light modulator 120 generally scans the first hologram pattern PL and the second hologram pattern PR alternately in a progressive scan way. For example, FIG. 3 is an exemplary diagram of a process in which the spatial light modulator 120 scans the first and second hologram patterns PL and PR in a progressive scan way when alternately forming the first and second hologram images L and R in a time divisional way. Referring to FIG. 3, the spatial light modulator 120 may display the first hologram pattern PL in a first frame, display the second hologram pattern PR in a second frame that is subsequent to the first frame, and display the first hologram pattern PL again in a third frame that is subsequent to the second frame. The first hologram pattern PL of the first frame and the second hologram pattern PR of the second frame may have different pieces of viewpoint information regarding a same image. The first hologram pattern PL of the first frame and the first hologram pattern PL of the third frame may have temporally continuous image information having a same viewpoint.

However, the first and second hologram patterns PL and PR may be simultaneously displayed on the spatial light modulator 120 during a transition period between frames. For example, during a transition period T1 between the first and second frames, the first hologram pattern PL may be partially displayed on a partial region of the spatial light modulator 120, and the second hologram pattern PR may be partially displayed on a remaining partial region thereof. Likewise, during a transition period T2 between the second and third frames, the second hologram pattern PR may be partially displayed on a partial region of the spatial light modulator 120, and the first hologram pattern PL may be partially displayed on a remaining partial region thereof.

Thus, if the first hologram pattern PL and the second hologram pattern PR have a same phase modulation value, binocular crosstalk, in which the first hologram image L is formed in a right eye ER viewing zone of an observer or the second hologram image R is formed in a left eye EL viewing zone of the observer during the transition periods T1 and T2, may occur. To prevent the binocular crosstalk, the control unit 130 of the holographic display apparatus 100 according to an exemplary embodiment may establish a first phase modulation value tL of the first hologram pattern PL and a second phase modulation value tR of the second hologram pattern PR to be different from each other such that hologram images having different viewpoints reproduced by the first hologram pattern PL and the second hologram pattern PR may be formed on different spaces.

Figure 4:
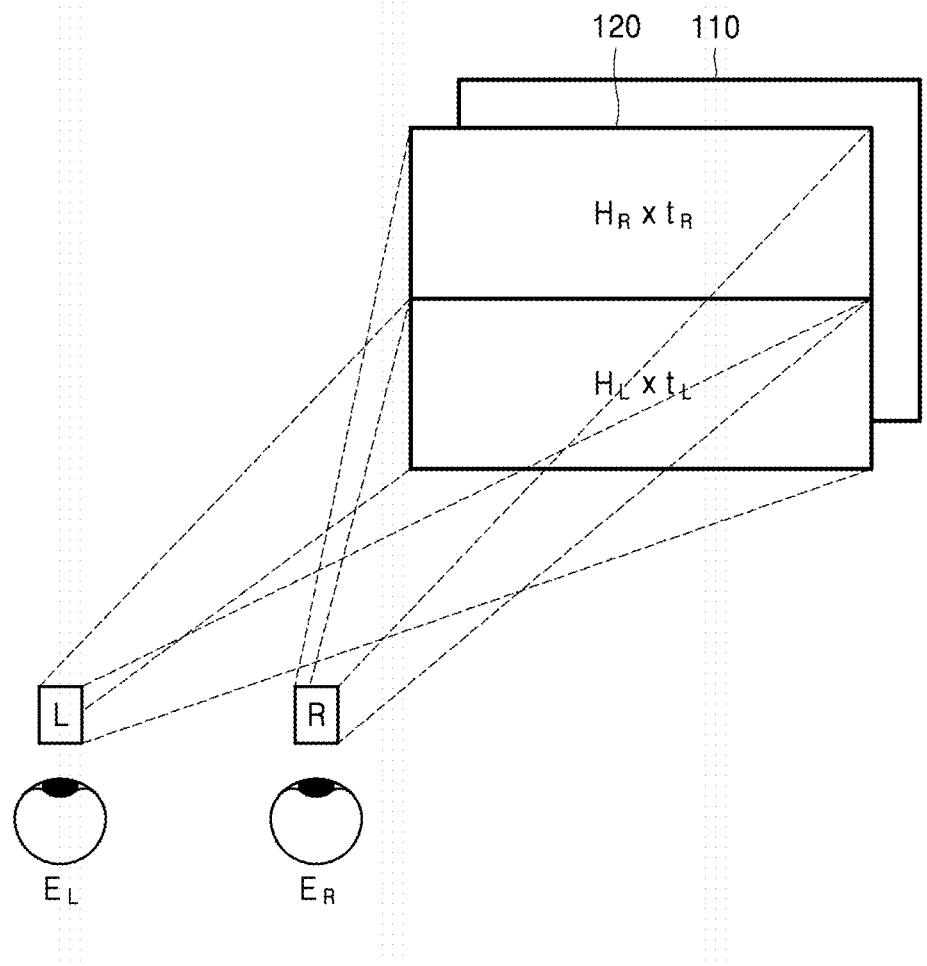
FIG. 4 is an exemplary diagram of a holographic display apparatus that provides hologram images of different viewpoints to left and right-eye viewing zones of an observer without binocular crosstalk during a transition period between frames.

For example, FIG. 4 is an exemplary diagram of the holographic display apparatus 100 that provides hologram images L and R of different viewpoints to left and right-eye viewing zones EL and ER of an observer without binocular crosstalk during a transition period between frames. Referring to FIG. 4, the first hologram pattern PL is formed in a lower area of the spatial light modulator 120 and the second hologram pattern PR is formed in an upper area thereof. The control unit 130 may establish the first phase modulation value tL and the second phase modulation value tR to be different from each other such that the first hologram image L formed by the first hologram pattern PL travels to the left eye EL viewing zone of the observer and the second hologram image R formed by the second hologram pattern PR travels to the left eye EL viewing zone of the observer. Thus, the holographic display apparatus 100 may provide the hologram images L and R of different viewpoints to the left EL and right ER eye viewing zones of the observer without binocular crosstalk during the transition period between frames.

Figure 5:
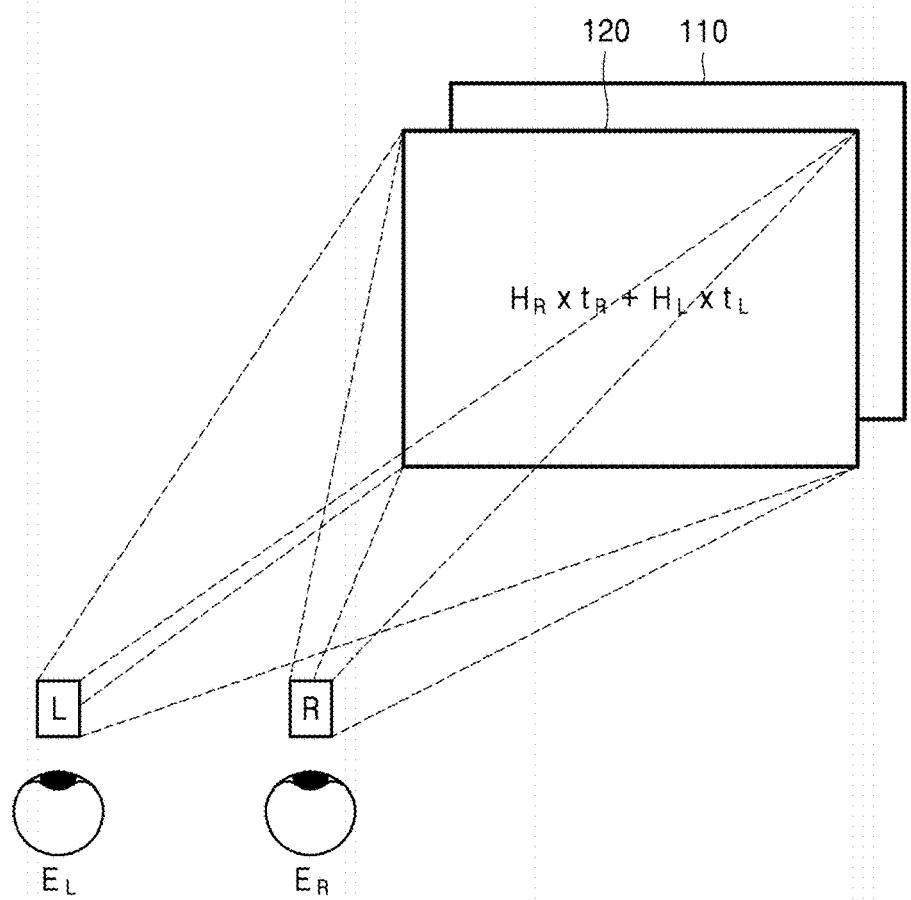
FIG. 5 is an exemplary diagram of a holographic display apparatus that simultaneously provides hologram images of different viewpoints to left and right-eye viewing zones of an observer.

Although the holographic display apparatus 100 may alternately form the first hologram image L and the second hologram image R in a time divisional method as described above, the holographic display apparatus 100 may simultaneously form the first hologram image L and the second hologram image R by overlapping the first hologram pattern PL and the second hologram pattern PR according to a hologram characteristic. For example, FIG. 5 is an exemplary diagram of the holographic display apparatus 100 that simultaneously provides the first and second hologram images L and R of different viewpoints to the left and right-eye viewing zones EL and ER of an observer. Referring to FIG. 5, the spatial light modulator 120 displays the first hologram pattern PL=HL×tL and the second hologram pattern PR=HR×tR on a frame by overlapping the first hologram pattern PL=HL×tL and the second hologram pattern PR=HR×tR according to a hologram signal provided by the control unit 130.

Figure 6:
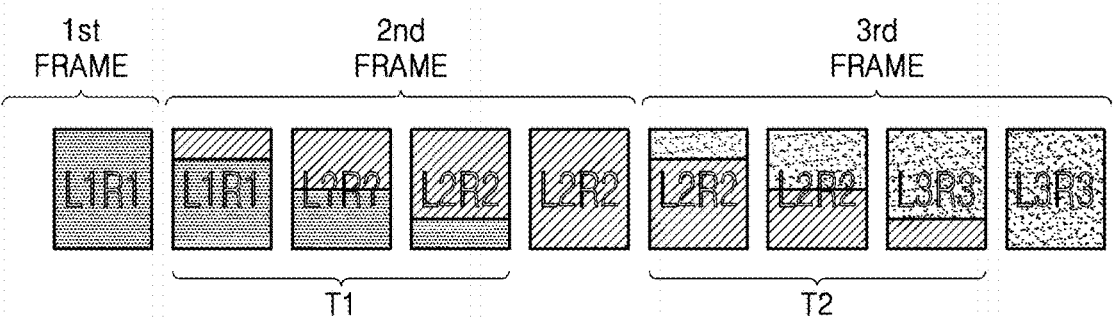
FIG. 6 is an exemplary diagram for describing a process in which a spatial light modulator scans hologram patterns when simultaneously providing hologram images of different viewpoints to left and right-eye viewing zones of an observer.

FIG. 6 is an exemplary diagram for describing a process in which the spatial light modulator 120 scans the first and second hologram patterns PL and PR when simultaneously providing the first and second hologram images L and R of different viewpoints to the left and right-eye viewing zones EL and ER of an observer. Referring to FIG. 6, the spatial light modulator 120 may scan first and second hologram patterns PL1 and PR1 overlapping on a first frame, first and second hologram patterns PL2 and PR2 overlapping on a second frame, and first and second hologram patterns PL3 and PR3 overlapping on a third frame in a progressive scanning method.

Referring to FIG. 5, when the first hologram pattern PL and the second hologram pattern PR overlap and are displayed on a frame, binocular crosstalk may be prevented by differently establishing the first phase modulation value tL of the first hologram pattern PL and the second phase modulation value tR of the second hologram pattern PR. For example, if light emitted by the illumination unit 110 is modulated by the first hologram pattern PL and the second hologram pattern PR simultaneously displayed by the spatial light modulator 120, the first hologram image L and the second hologram image R are respectively formed. In this regard, the first phase modulation value tL of the first hologram pattern PL may be selected such that the first hologram image L approaches the left eye EL viewing zone of the observer, and the second phase modulation value tR of the second hologram pattern PR may be selected such that the second hologram image R approaches the right eye ER viewing zone of the observer. Thus, the first hologram image L and the second hologram image R may be simultaneously formed without crosstalk.

It has been described that the illumination unit 110 includes one light source unit. To form the first hologram image L and the second hologram image R using one light source unit, the spatial light modulator 120 may have a high resolution owing to a very small pixel pitch. However, when the illumination unit 110 uses two light source units, the condition of resolution of the spatial light modulator 120 may be relaxed.

Figure 7:
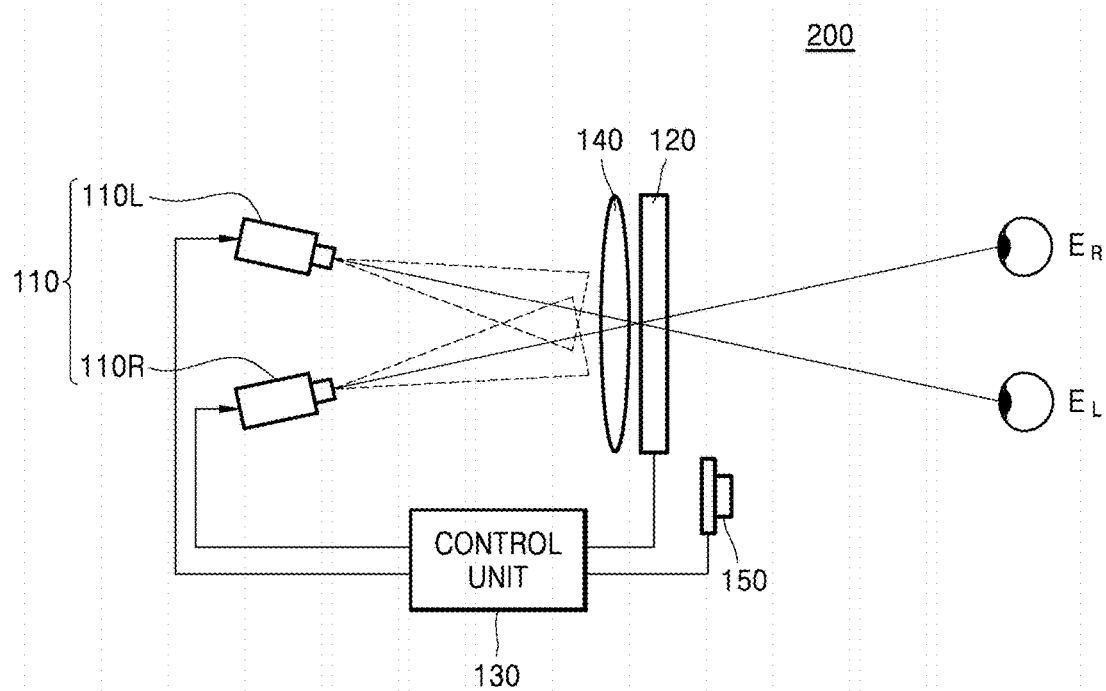
FIG. 7 is a conceptual diagram schematically showing a structure of a holographic display apparatus according to another exemplary embodiment.

For example, FIG. 7 is a conceptual diagram schematically showing a structure of a holographic display apparatus 200 according to another exemplary embodiment. Referring to FIG. 7, the holographic display apparatus 200 according to an exemplary embodiment may include a spatial light modulator 120 forming a hologram pattern for modulating light, an illumination unit 110 (e.g., illuminator) providing the light to the spatial light modulator 120, and a control unit 130 (e.g., controller) controlling operations of the spatial light modulator 120 and the illumination unit 110. The holographic display apparatus 100 may further include an eye tracking unit 150 tracking a pupil location of an observer.

The illumination unit 110 may include a first light source unit 110L for a hologram image that is to be formed on a left eye EL of the observer and a second light source unit 110R for a hologram image that is to be formed on a right eye ER of the observer. The first and second light source units 110L and 110R may be disposed to emit light which is inclined incident to the spatial light modulator 120. For example, the first light source unit 110L may be disposed diagonally opposite to the left eye EL of the observer with respect to a center of the spatial light modulator 120, and the second light source unit 120L may be disposed diagonally opposite to the right eye ER of the observer with respect to the center of the spatial light modulator 120. The first and second light source units 110L and 110R may be laser light sources or an array of LEDs providing light having spatial coherence.

The holographic display apparatus 200 may further include a lens 140 allowing a reproduction light formed by modulating light by using the spatial light modulator 120 to be focused on a predetermined space. The reproduction light is focused on the predetermined space by the lens 140, and thus, the hologram image may be formed on the space. The lens 140 is disposed between the illumination unit 110 and the spatial light modulator 120 in FIG. 7 but is not limited thereto. For example, the lens 140 may be disposed in front of the spatial light modulator 120, e.g., between the spatial light modulator 120 and the observer. If the illumination unit 110 provides a focused beam, the lens 140 may be omitted.

Figure 8A:
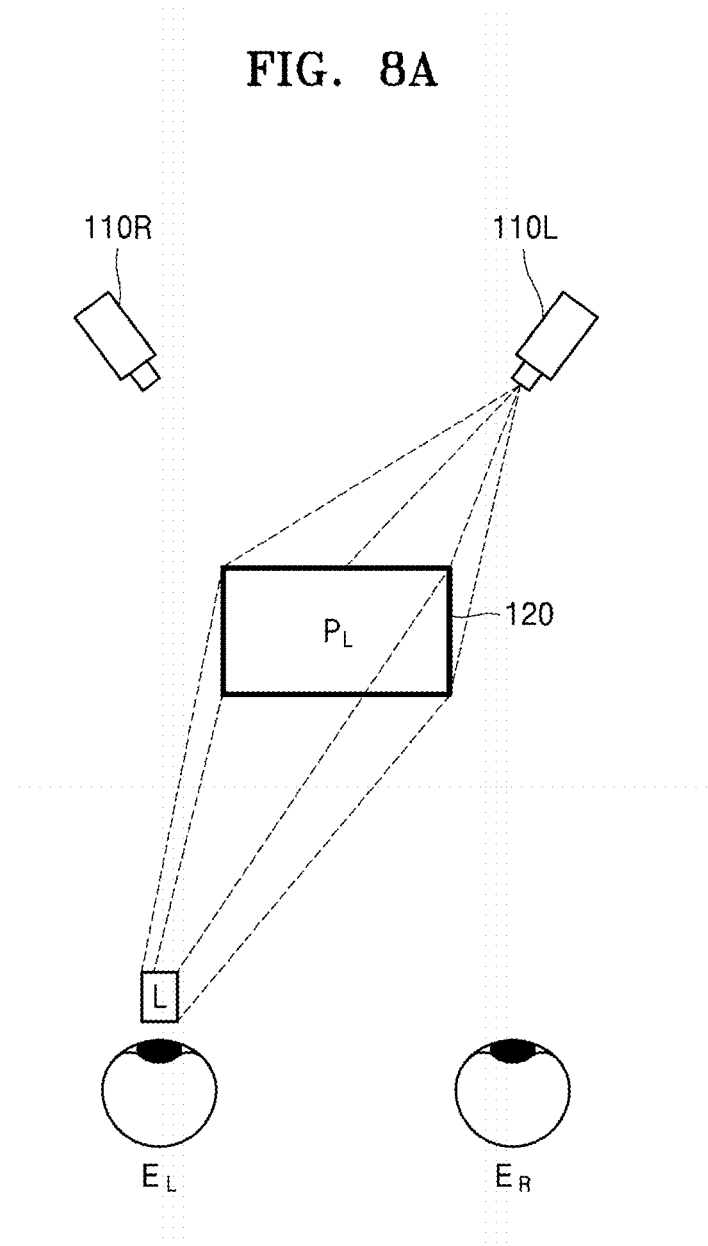
FIGS. 8A and 8B are exemplary diagrams of operations of the holographic display apparatus of FIG. 7 providing hologram images having different viewpoints to left and right-eye viewing zones of an observer in a time divisional way.
Figure 8B:
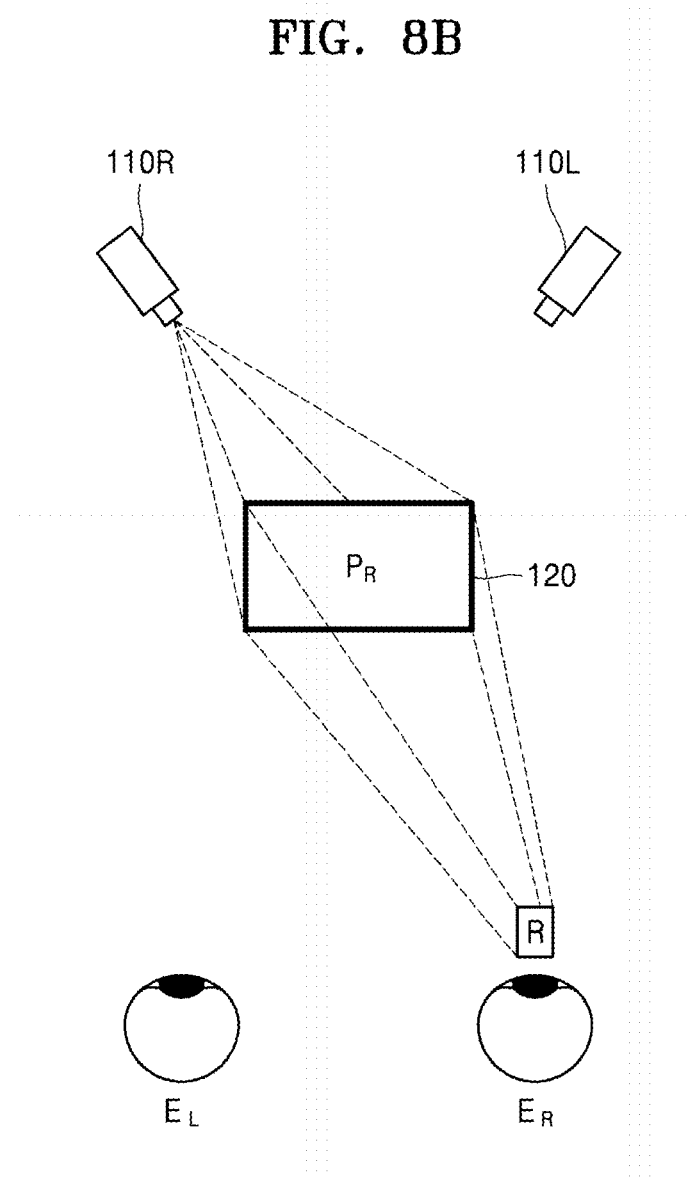

For example, FIGS. 8A and 8B are exemplary diagrams of operations of the holographic display apparatus 200 of FIG. 7 providing hologram images having different viewpoints to the left and right-eye viewing zones EL and ER of an observer in a time divisional way.

Referring to FIG. 8A, the spatial light modulator 120 forms the first hologram pattern PL according to a hologram signal provided by the control unit 130 at a first time. The first light source unit 110L provides light to the spatial light modulator 120 according to the control of the control unit 130. Then, the light from the first light source unit 110L is diffracted and modulated by the first hologram pattern PL, and thus, object light may be reproduced. The object light may be projected to the left eye EL viewing zone of the observer, and thus, the first hologram image L may be formed. Thus, the first hologram image L may be seen by the left eye EL of the observer at the first time.

As described above, to form the first hologram image L in the left eye EL viewing zone of the observer by exactly projecting the object light to the left eye EL viewing zone of the observer, a phase modulation transfer function such as Equation 1 may be used. That is, the first hologram pattern PL may be expressed as a multiplication HL×tL of the phase modulation value tL of the phase modulation transfer function of Equation 1 above and the hologram data HL of the first hologram image L. The phase modulation value may be established to allow the first hologram image L formed by modulating the light emitted from the first light source unit 110L with the first hologram pattern PL incident to the left eye EL viewing zone of the observer.

Referring to FIG. 8B, the spatial light modulator 120 forms the second hologram pattern PR=HR×tR according to the hologram signal provided by the control unit 130 at a second time. The second light source unit 110R provides light to the spatial light modulator 120 according to the control of the control unit 130. Then, the light is diffracted and modulated by the second hologram pattern PR and thus object light may be reproduced. The object light may be projected to the right eye ER viewing zone of the observer, and thus, the second hologram image R may be formed. Thus, the second hologram image R may be seen by the right eye ER of the observer at the second time.

In this regard, to form the second hologram image R in the right eye ER viewing zone of the observer by exactly projecting the object light to the right eye ER viewing zone of the observer, the phase modulation transfer function may be used according to Equation 1 above. That is, the second hologram pattern PR may be expressed as a multiplication HR×tR of the phase modulation value tR of the phase modulation transfer function of Equation 1 above and the hologram data HR of the second hologram image R. The phase modulation value may be established to allow the second hologram image R formed by modulating the light emitted from the second light source unit 110R with the second hologram pattern PR incident to the right eye ER viewing zone of the observer.

However, as shown with reference to FIG. 3 above, if the spatial light modulator 120 scans the first hologram pattern PL and the second hologram pattern PR alternately in a progressive scan method, the two hologram patterns PL and PR may be simultaneously displayed on the spatial light modulator 120 during a transition period between frames. Thus, if the first hologram pattern PL and the second hologram pattern PR have a same phase modulation value, binocular crosstalk, in which the first hologram image L is formed in a right eye ER viewing zone of an observer or the second hologram image R is formed in a left eye EL viewing zone of the observer during the transition periods T1 and T2, may occur. For example, if the second light source unit 110R provides light to the spatial light modulator 120, as shown in FIG. 8B, during the transition period T1 between the first and second frames, images having different viewpoints formed by the second hologram pattern PR and the first hologram pattern PL displayed on the spatial light modulator 120 may be formed in the right eye ER viewing zone of the observer. If the first light source unit 110L provides light to the spatial light modulator 120, as shown in FIG. 8A, during the transition period T2 between the second and third frames, images having different viewpoints formed by the first hologram pattern PL and the second hologram pattern PR displayed on the spatial light modulator 120 may be formed in the left eye EL viewing zone of the observer.

To prevent the binocular crosstalk, the control unit 130 of the holographic display apparatus 200 according to an exemplary embodiment may establish the first phase modulation value tL of the first hologram pattern PL and the second phase modulation value tR of the second hologram pattern PR to be different from each other such that hologram images having different viewpoints formed by the first hologram pattern PL and the second hologram pattern PR may be formed on different spaces. For example, FIG. 9A is an exemplary diagram of an operation of the holographic display apparatus 200 generating a hologram image in the right eye ER viewing zone of an observer when the second light source unit 110R provides light to the spatial light modulator 120, and FIG. 9B is an exemplary diagram of an operation of the holographic display apparatus 200 generating a hologram image in the left eye EL viewing zone of an observer when the first light source unit 110L provides incident light to the spatial light modulator 120.

Figure 9A:
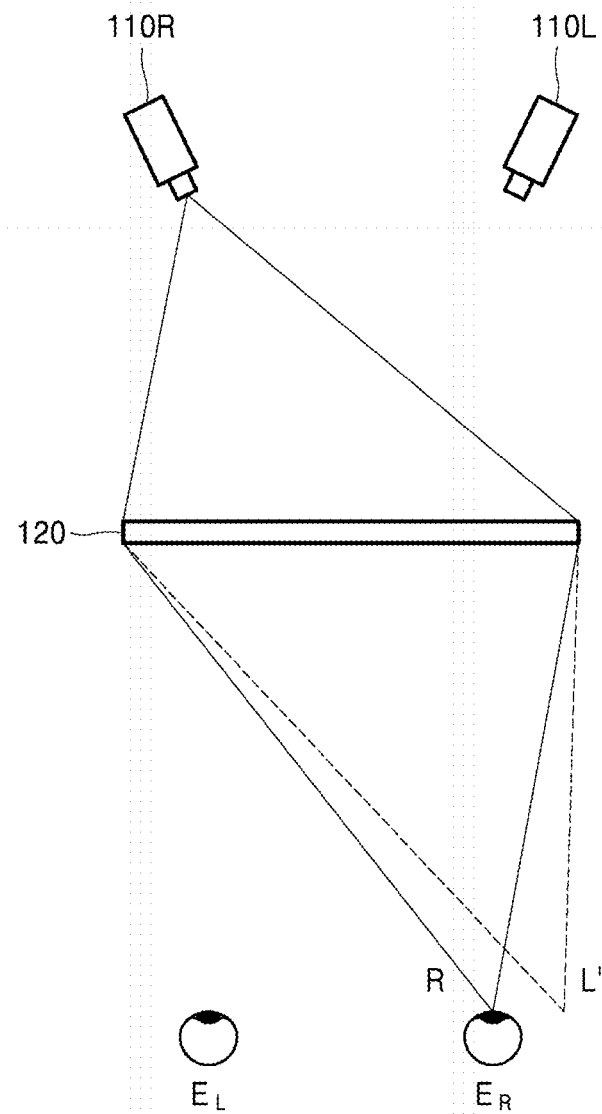
FIG. 9A is an exemplary diagram of an operation of a holographic display apparatus generating a hologram image in a right-eye viewing zone of an observer when a second light source unit of the holographic display apparatus of FIG. 7 provides light to a spatial light modulator.

Referring to FIG. 9A, during the transition period T1 between first and second frames, the second light source unit 110R provides light to the spatial light modulator 120. The second hologram pattern PR may be partially displayed on a partial region of the spatial light modulator 120, and the first hologram pattern PL may be partially displayed on a remaining partial region thereof. Then, the light emitted by the second light source unit 110R is incident on both the second hologram pattern PR and the first hologram pattern PL. Thus, the light emitted by the second light source unit 110R is modulated by the second hologram pattern PR and the first hologram pattern PL so that second and third hologram images R and L' having different viewpoints are formed. The second hologram image R is a normal image, whereas the third hologram image L' is an abnormal image that causes crosstalk in the right eye ER viewing zone of the observer. The control unit 130 establishes the second phase modulation value tR of the second hologram pattern PR such that the normal second hologram image R may be exactly incident to the right eye ER viewing zone. To prevent the crosstalk, the control unit 130 establishes the first phase modulation value tL of the first hologram pattern PL such that the third hologram image L' may be incident to a location beyond the right eye ER viewing zone of the observer. Then, as shown in FIG. 9A, only the second hologram image R is incident on the right eye ER viewing zone of the observer, thereby preventing the crosstalk.

Figure 9B:
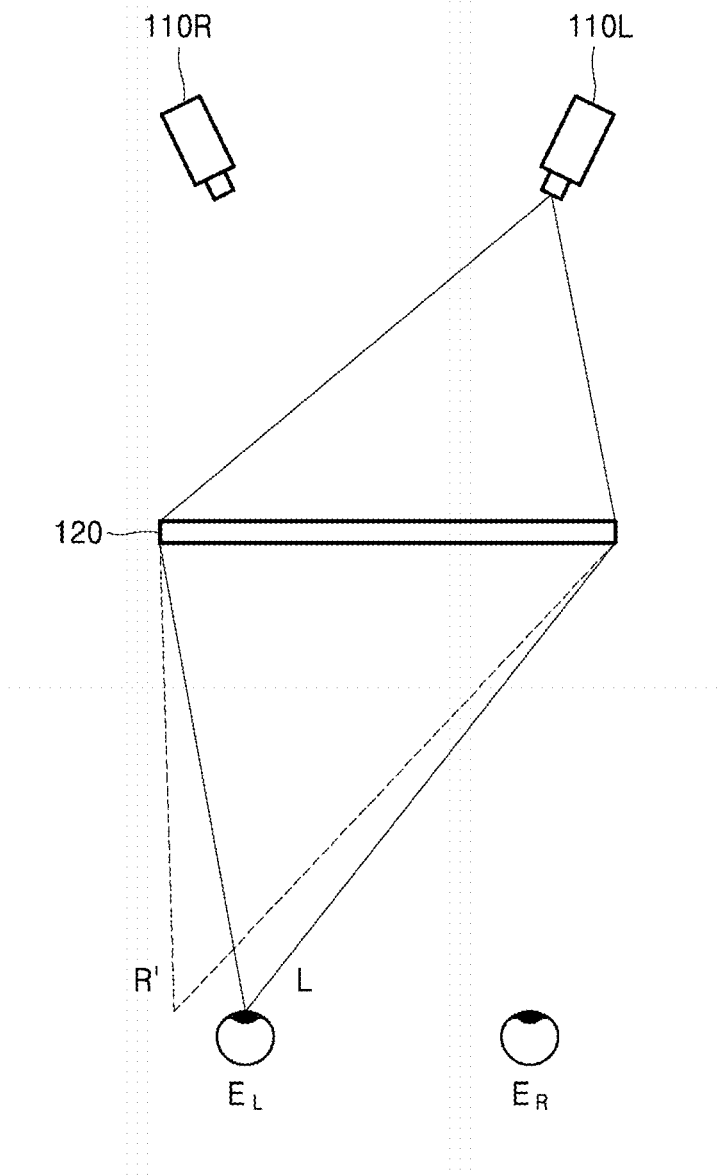
FIG. 9B is an exemplary diagram of an operation of a holographic display apparatus generating a hologram image in a left-eye viewing zone of an observer when a first light source unit of the holographic display apparatus of FIG. 7 provides light to a spatial light modulator.

Referring to FIG. 9B, during the transition period T2 between second and third frames, the first light source unit 110L provides light to the spatial light modulator 120. The first hologram pattern PL may be partially displayed on a partial region of the spatial light modulator 120, and the second hologram pattern PR may be partially displayed on a remaining partial region thereof. Then, the light emitted by the first light source unit 110L is incident on both the first hologram pattern PL and the second hologram pattern PR. Thus, the light emitted by the first light source unit 110L is modulated by the first hologram pattern PL and the second hologram pattern PR so that first and fourth hologram images L and R' having different viewpoints are formed. The first hologram image L is a normal image, whereas the fourth hologram image R' is an abnormal image that causes crosstalk in the left eye EL viewing zone of the observer. The control unit 130 establishes the first phase modulation value tL of the first hologram pattern PL such that the normal first hologram image L may be exactly incident to the left eye EL viewing zone. To prevent the crosstalk, the control unit 130 establishes the second phase modulation value tR of the second hologram pattern PR such that the fourth hologram image R' may be incident to a location beyond the left eye EL viewing zone of the observer. Then, as shown in FIG. 9B, only the first hologram image L is incident on the left eye EL viewing zone of the observer, thereby preventing the crosstalk.

In conclusion, the first phase modulation value tL may be established such that the normal first hologram image L formed by modulating the light emitted by the first light source unit 110L by using the first hologram pattern PL may be incident on the left eye EL viewing zone of the observer, and the abnormal third hologram image L' formed by modulating the light emitted by the second light source unit 110R by using the first hologram pattern PL may be incident on the location beyond the right eye ER viewing zone of the observer. The second phase modulation value tR may be established such that the normal second hologram image R formed by modulating the light emitted by the second light source unit 110R by using the second hologram pattern PR may be incident to the right eye ER viewing zone of the observer, and the abnormal fourth hologram image R' formed by modulating the light emitted by the first light source unit 110L by using the second hologram pattern PR may be incident on the location beyond the left eye EL viewing zone of the observer. The first hologram pattern PL may be represented as a multiplication HL×tL of the hologram data HL of the first hologram image L and the first phase modulation value tL, and the second hologram pattern PR may be represented as a multiplication HR×tR of the hologram data HR of the second hologram image R and the second phase modulation value tR.

Figure 10:
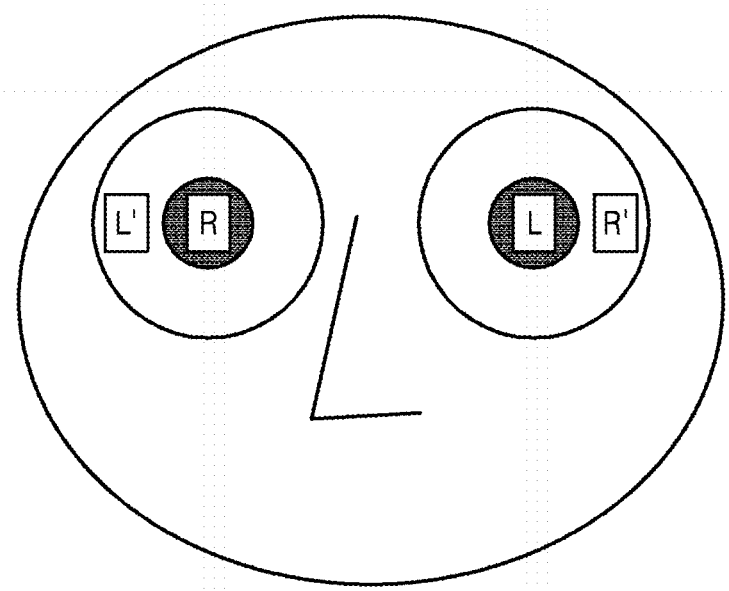
FIG. 10 is an exemplary diagram of a status in which hologram images having different viewpoints are provided to left and right-eye viewing zones of an observer without binocular crosstalk.

As shown in FIG. 10, the observer may recognize the normal first hologram image L and second hologram image R that are incident on the pupils of the left eye EL and the right eye ER of the observer, whereas the observer may not recognize the abnormal third hologram image L' and the fourth hologram image R' that are beyond the pupils of the left eye EL and the right eye ER of the observer, thereby preventing the crosstalk.

Figure 11:
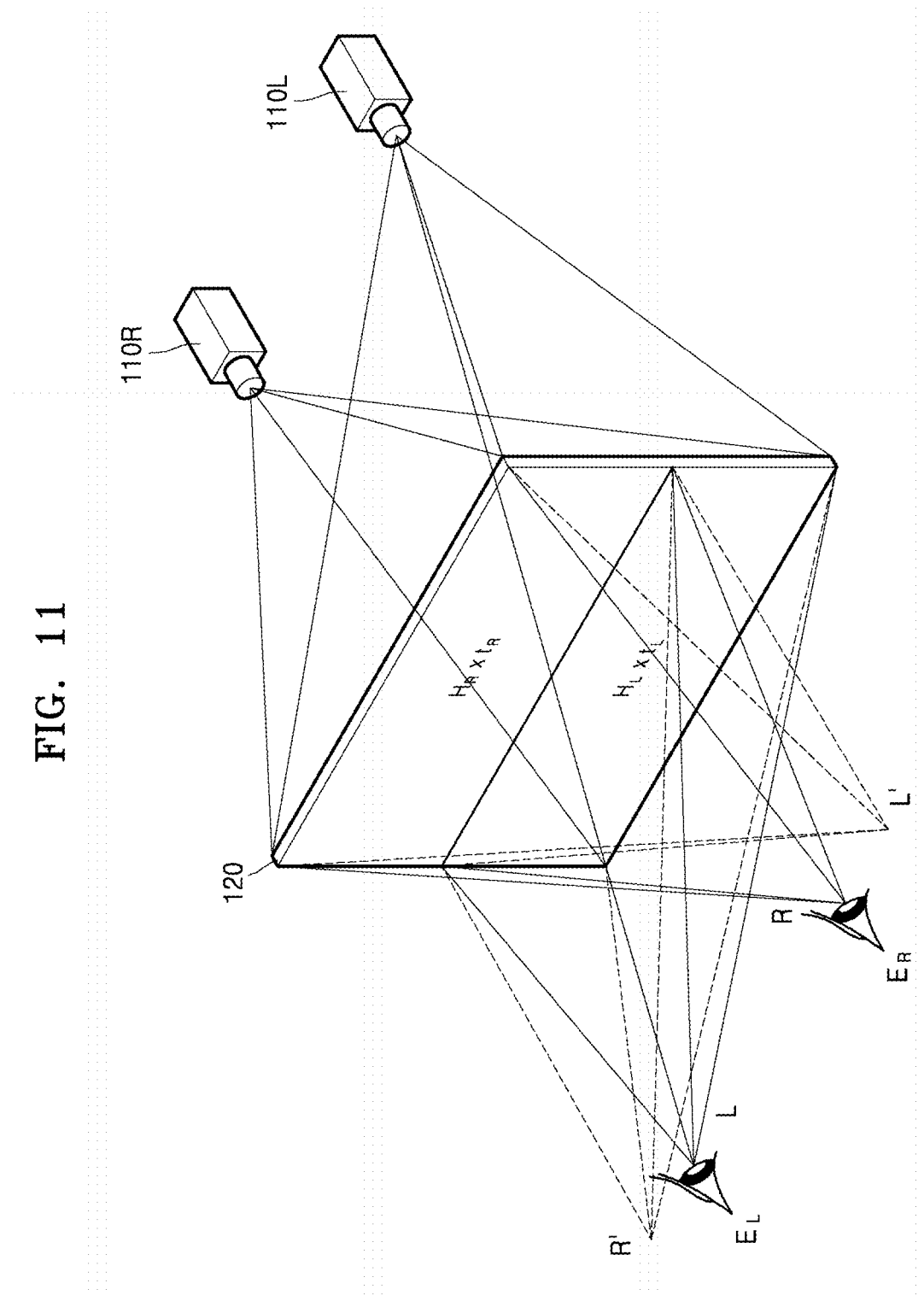
FIG. 11 is an exemplary diagram of an operation of a holographic display apparatus generating hologram images in left and right-eye viewing zones of an observer when first and second light source units provide reference light to a spatial light modulator.
Figure 12:
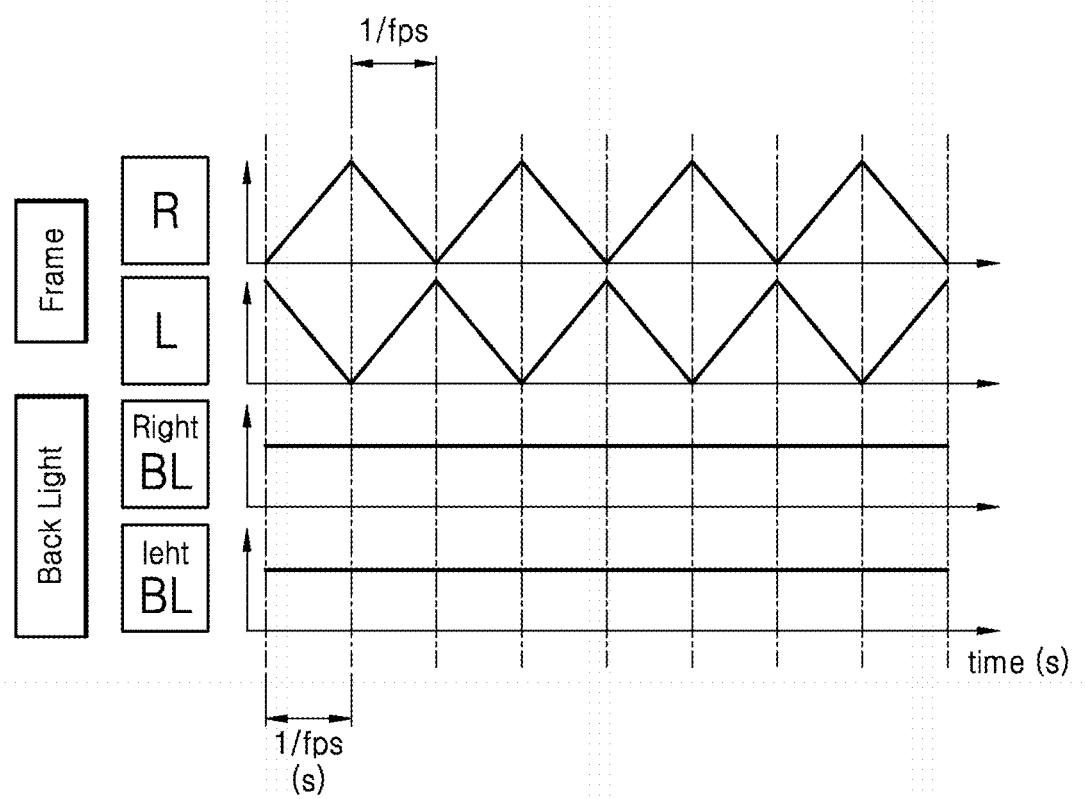
FIG. 12 is an exemplary timing diagram of a process of operating an illumination unit and a spatial light modulator in the operation of the holographic display apparatus of FIG. 11.

As described above, no crosstalk occurs by the fourth hologram image R' formed by modulating the light emitted by the first light source unit 110L by using the second hologram pattern PR and the third hologram image L' formed by modulating the light emitted by the second light source unit 110R by using the first hologram pattern PL, and thus, it is unnecessary to alternately emit light by the first light source unit 110L and the second light source unit 110R. For example, FIG. 11 is an exemplary diagram of an operation of the holographic display apparatus 200 generating the hologram images L and R in left eye EL and right eye ER viewing zones of an observer when the first and second light source units 110L and 110R provide light to the spatial light modulator 120. FIG. 12 is an exemplary timing diagram of a process of operating the illumination unit 110 and the spatial light modulator 120 in the operation of the holographic display apparatus 200 of FIG. 11

As shown in FIGS. 11 and 12, although both of the first and second light source units 110L and 110R provide the light to the spatial light modulator 120, the observer may recognize the normal first and second hologram images L and R that are exactly incident on the pupils of the left eye EL and the right eye ER of the observer, whereas the observer may not recognize the abnormal third hologram image L' that is beyond the pupils of the right eye ER of the observer. The observer may not also recognize the abnormal fourth hologram image R' that is beyond the pupils of the left eye EL of the observer.

Therefore, it is unnecessary to alternately operate the first and second light source units 110R and 110L in synchronization with a frame period of the spatial light modulator 120, and thus, a configuration of the holographic display apparatus 200 may be simplified. According to an exemplary embodiment, when the first and second hologram images L and R are provided in a time divisional way, since there is no need to insert an intermediate frame for preventing crosstalk between a frame of the first hologram image L and a frame of the second hologram image R, an image frame rate of the holographic display apparatus 200 may be improved.

When locations of the pupils are changed when the eyes of the observer move, the control unit 130 may change first and second phase modulation values with respect to a pupil location change of the observer based on information provided by the eye tracking unit 150. The control unit 130 may reestablish the first and second phase modulation values so as to prevent the crosstalk even when the first and second phase modulation values are changed according to the pupil location change of the observer. For example, the control unit 130 may change the first and second phase modulation values such that a location difference between the first hologram image L and the fourth hologram image R' and a location difference between the second hologram image R and the third hologram image L' may be maintained to be greater than sizes of the pupils of the observer in response to the pupil location change of the observer.

Figure 13A:
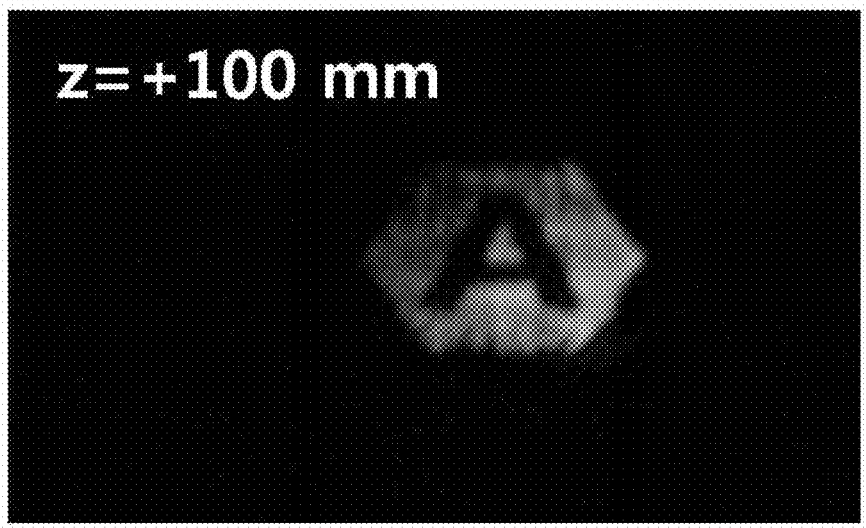
FIGS. 13A, 13B, 14A, and 14B are actually formed hologram images in which no crosstalk occurs.
Figure 13B:
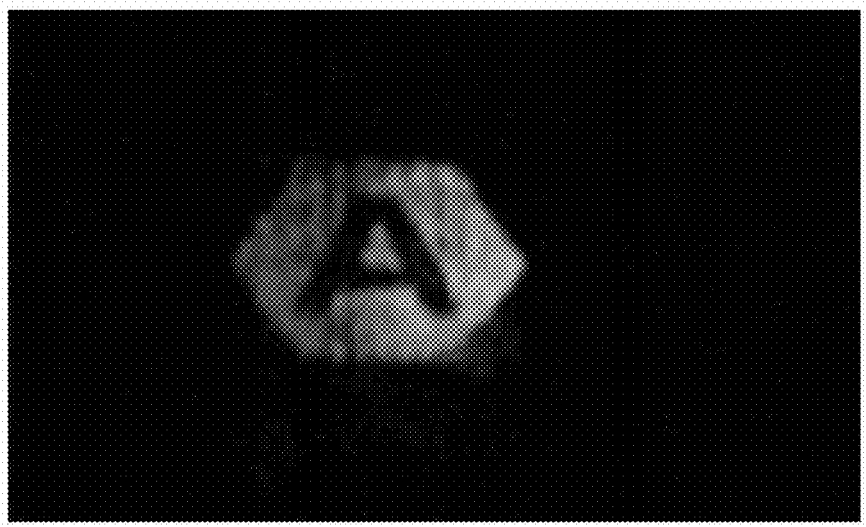
Figure 14A:
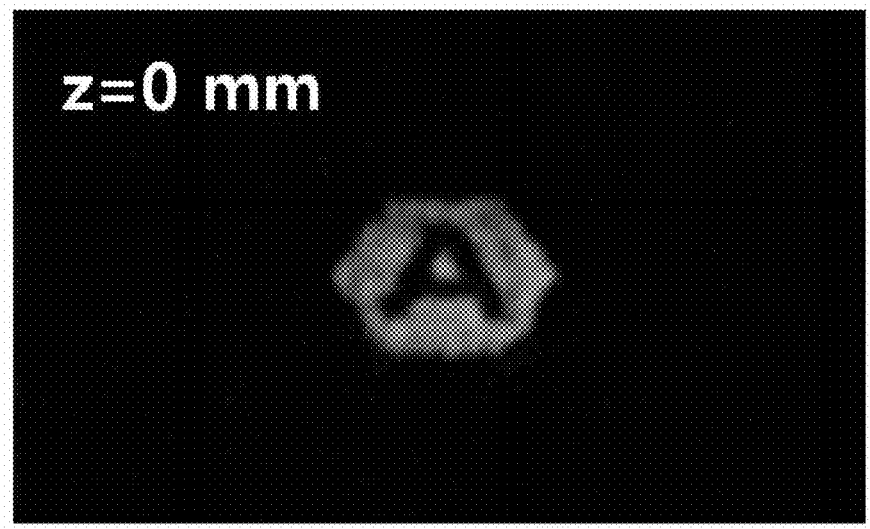
Figure 14B:
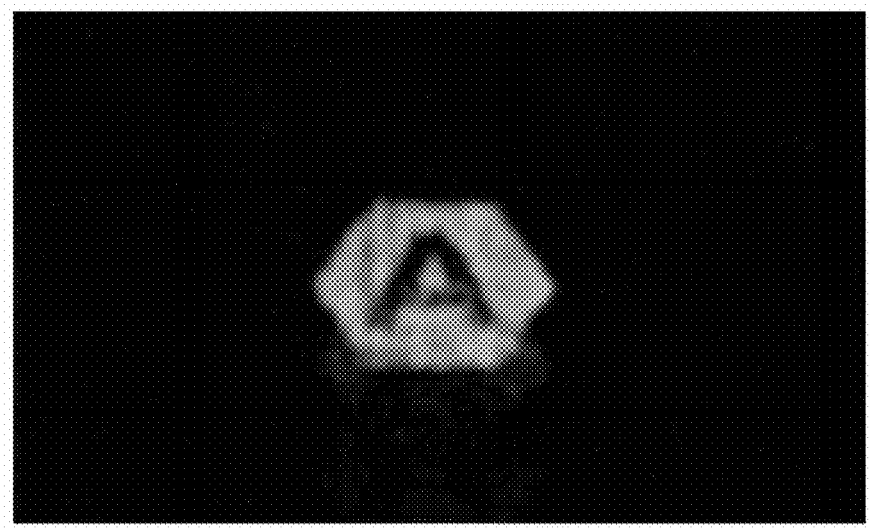

FIGS. 13A, 13B, 14A, and 14B are actually formed hologram images in which no crosstalk occurs. FIGS. 13A, 13B, 14A, and 14B show results of capturing hologram images by actually forming the hologram image and placing cameras in left eye EL and right eye ER viewing zones, to show that the crosstalk may be removed by using the above-described method. In more detail, FIG. 13A is a result of photographing the first hologram image L having a depth of +100 mm by using a camera in the left eye EL viewing zone, and FIG. 13B is a result of capturing the second hologram image R having the depth of +100 mm by using a camera in the right eye ER viewing zone. FIG. 14A is a result of capturing the second hologram image R having a depth of 0 mm by using the camera in the right eye ER viewing zone, and FIG. 14B is a result of capturing the second hologram image R having the depth of 0 mm by using the camera in the left eye EL viewing zone. As shown in FIGS. 13A, 13B, 14A, and 14B, no crosstalk occurs in the images captured by using the cameras in the left eye EL viewing zone and the right eye ER viewing zone.

Figure 15:
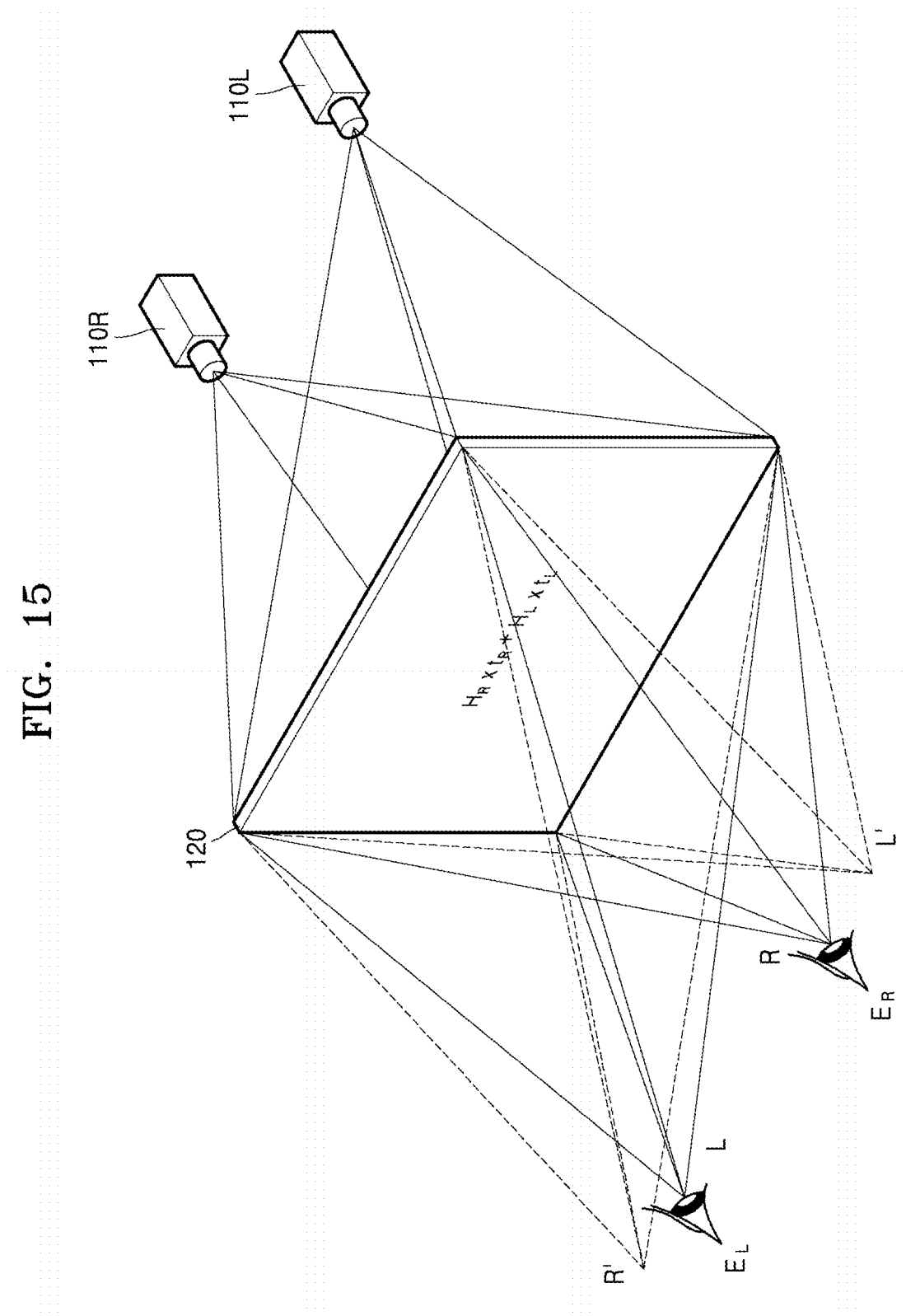
FIG. 15 is an exemplary diagram of an operation of a holographic display apparatus simultaneously providing hologram images having different viewpoints in a left-eye viewing zone and a right-eye viewing zone of an observer.
Figure 16:
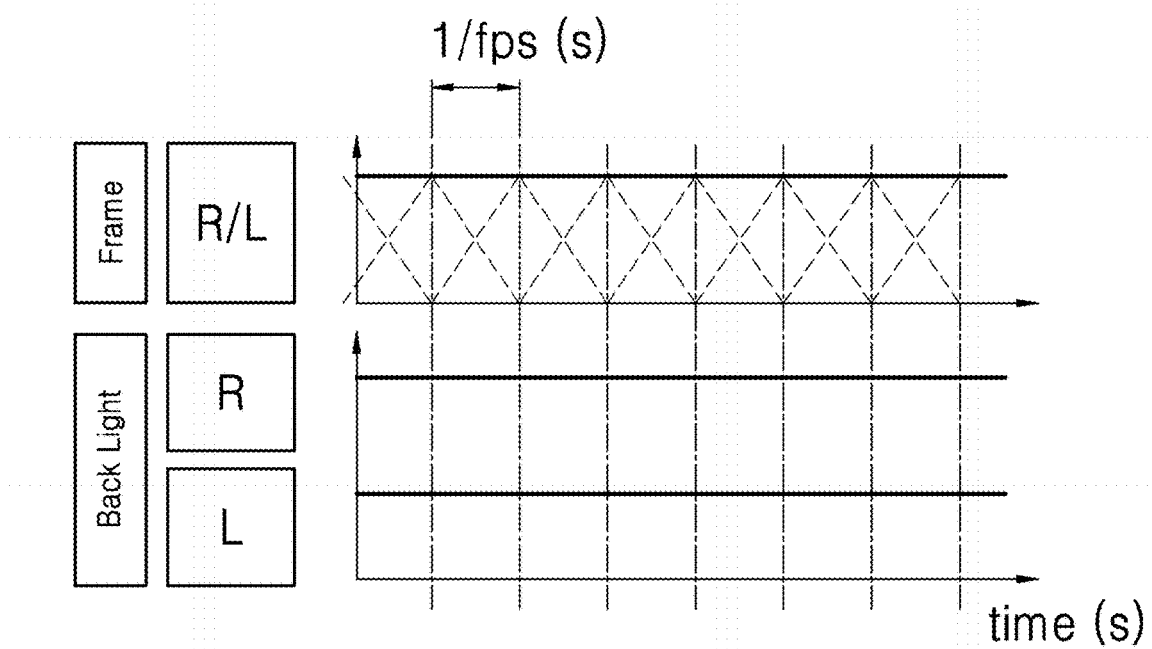
FIG. 16 is an exemplary timing diagram of a process of operating an illumination unit and a spatial light modulator in the operation of the holographic display apparatus of FIG. 15.

Although a holographic display method of alternately forming the first hologram image L and the second hologram image R in a time divisional way is described above, the first hologram image L and the second hologram image R may be simultaneously formed by overlapping the first hologram pattern PL and the second hologram pattern PR according to a hologram characteristic. FIG. 15 is an exemplary diagram of an operation of the holographic display apparatus 100 simultaneously providing the first and second hologram images L and R having different viewpoints in a left eye EL viewing zone and a right eye ER viewing zone of an observer. FIG. 16 is an exemplary timing diagram of a process of operating the illumination unit 110 and the spatial light modulator 120 in the operation of the holographic display apparatus 200 of FIG. 15. Referring to FIGS. 15 and 16, the spatial light modulator 120 displays the first hologram pattern PL and the second hologram pattern PR on a frame by overlapping the first hologram pattern PL and the second hologram pattern PR according to a hologram signal provided by the control unit 130.

For example, as shown in FIG. 16, the spatial light modulator 120 may scan first and second hologram patterns PL1 and PR1 overlapping on a first frame, first and second hologram patterns PL2 and PR2 overlapping on a second frame, and first and second hologram patterns PL3 and PR3 overlapping on a third frame in a progressive scanning way.

Referring to FIG. 15, when the first hologram pattern PL and the second hologram pattern PR overlap and are displayed on a frame, binocular crosstalk may be prevented by establishing a first phase modulation value of the first hologram pattern PL and a second phase modulation value of the second hologram pattern PR to be different from each other. For example, if light emitted by the first light source unit 11 OL is modulated by the first hologram pattern PL and the second hologram pattern PR simultaneously displayed by the spatial light modulator 120, the first hologram image L and the fourth hologram image R' are respectively formed. The first phase modulation value tL of the first hologram pattern PL may be selected such that the first hologram image L approaches the left eye EL viewing zone of the observer, and the second phase modulation value tR of the second hologram pattern PR may be selected such that the fourth hologram image R' is beyond the left eye EL viewing zone of the observer. If light emitted by the second light source unit 110R is modulated by the first hologram pattern PL and the second hologram pattern PR simultaneously displayed by the spatial light modulator 120, the third hologram image L' and the second hologram image R are respectively formed. The first phase modulation value tL of the first hologram pattern PL may be selected such that the third hologram image L' is beyond the right eye ER viewing zone of the observer, and the second phase modulation value tR of the second hologram pattern PR may be selected such that the second hologram image R approaches the right eye ER viewing zone of the observer. Thus, the first hologram image L and the second hologram image R may be simultaneously formed without crosstalk.

In the above-described exemplary embodiments, the control unit 130 may prevent the crosstalk by establishing the first phase modulation value tL of the first hologram pattern PL and the second phase modulation value tR of the second hologram pattern PR. As described above, the control unit 130 may be implemented by using software or a semiconductor chip functioning as the software, and thus, no additional machine or electronic device may be required to prevent the crosstalk.

Cases where each of the holographic display apparatuses 100 and 200 forms the two hologram images L and R of different viewpoints in two viewing zones of different spatial locations are described above. However, the exemplary embodiments are not limited thereto, and according to other exemplary embodiments, three or more hologram images of different viewpoints may be formed in three or more viewing zones. For example, the spatial light modulator 120 may form three or more hologram patterns sequentially or simultaneously by overlapping the three or more hologram patterns, and the control unit 130 may establish phase modulation values of the three or more hologram patterns to be different from each other. In this regard, the control unit may establish the phase modulation values such that gaps between three or more different viewing zones are maintained to be greater than sizes of the pupils of an observer. For example, the control unit may establish a phase modulation value of each of three or more hologram patterns such that location differences between three or more hologram images of different viewpoints reproduced by the three or more hologram patterns are maintained to be greater than the sizes of the pupils of the observer.

To facilitate understanding of the exemplary embodiments, holographic display apparatuses and holographic display methods according to certain exemplary embodiments have been described and shown in the accompanying drawings. However, it should be understood that such exemplary embodiments are merely intended to illustrate the exemplary embodiments and not to limit the exemplary embodiments. It should be also understood that the exemplary embodiments are not limited to the illustrated and provided description. This is because various modifications may be made by those of ordinary skill in the art.

What is claimed is:

1. A holographic display apparatus comprising:
a spatial light modulator configured to generate hologram patterns to modulate light; and
an illuminator configured to emit the light to the spatial light modulator,
wherein the spatial light modulator is configured to generate, from among the hologram patterns, a first hologram pattern and a second hologram pattern according to the control operations of the holographic display apparatus, the first hologram pattern and the second hologram pattern being configured to form a first hologram image and a second hologram image having different viewpoints,
wherein the holographic display apparatus is configured to set a first phase modulation value of the first hologram pattern and a second phase modulation value of the second hologram pattern to be different from each other such that hologram images having different viewpoints formed by the first hologram pattern and the second hologram pattern are formed on different spatial locations, and
wherein the first hologram pattern is represented as a product of hologram data of the first hologram image multiplied with the first phase modulation value, and the second hologram pattern is represented as a product of hologram data of the second hologram image multiplied with the second phase modulation value.

2. The holographic display apparatus of claim 1, wherein the holographic display apparatus is configured to control the spatial light modulator to alternately scan the first hologram pattern and the second hologram pattern in a progressive scanning way in order to alternately form the first hologram image and the second hologram image in a time division way.

3. The holographic display apparatus of claim 2, wherein the spatial light modulator is configured to display the first hologram pattern on a first frame, the second hologram pattern on a second frame that is subsequent to the first frame, a part of the first hologram pattern on a partial area of the spatial light modulator, and a part of the second hologram pattern on a remaining partial area of the spatial light modulator during a transition period between the first frame and the second frame.

4. The holographic display apparatus of claim 3, wherein the holographic display apparatus is configured to set the first phase modulation value such that the first hologram image modulated and formed by the first hologram pattern is transmitted to a first viewing zone and to set the second phase modulation value such that the second hologram image modulated and formed by the second hologram pattern is transmitted to a second viewing zone different from the first viewing zone during the transition period.

5. The holographic display apparatus of claim 1, wherein the holographic display apparatus is configured to control the spatial light modulator to overlap and display the first hologram pattern and the second hologram pattern on one frame.

6. The holographic display apparatus of claim 5, wherein the holographic display apparatus is configured to set the first phase modulation value such that the first hologram image formed by the first hologram pattern among the overlapped first hologram pattern and second hologram pattern is transmitted to a first viewing zone and set the second phase modulation value such that the second hologram image modulated and formed by the second hologram pattern is transmitted to a second viewing zone different from the first viewing zone.

7. The holographic display apparatus of claim 1, wherein the illuminator comprises one light source configured to emit light.

8. The holographic display apparatus of claim 7, wherein the holographic display apparatus is configured to set the first phase modulation value such that the first hologram image formed by modulating light emitted by the light source by using the first hologram pattern is incident to a first viewing zone, and to set the second phase modulation value such that the second hologram image formed by modulating the light emitted by the light source by using the second hologram pattern is incident to a second viewing zone different from the first viewing zone.

9. The holographic display apparatus of claim 1, wherein the illuminator comprises a first light source configured to emit light for forming the first hologram image and a second light source configured to emit light for forming the second hologram image.

10. The holographic display apparatus of claim 9, wherein the holographic display apparatus is configured to set the first phase modulation value such that the first hologram image formed by modulating light emitted by the first light source by using a first hologram pattern is incident to a first viewing zone, and a third hologram image formed by modulating light emitted by the second light source by using the first hologram pattern is incident to a location beyond a second viewing zone.

11. The holographic display apparatus of claim 10, wherein the holographic display apparatus is configured to set the second phase modulation value such that the second hologram image formed by modulating the light emitted by the second light source by using the second hologram pattern is incident to the second viewing zone, and a fourth hologram image formed by modulating the light emitted by the first light source by using the second hologram pattern is incident to a location beyond the first viewing zone.

12. The holographic display apparatus of claim 11, further comprising: an eye tracker configured to track a pupil location of an observer observing the first hologram image, the second hologram image, the third hologram image and the fourth hologram image,
wherein the holographic display apparatus is configured to change the first phase modulation value and the second phase modulation value such that a location difference between the first hologram image and the fourth hologram image and a location difference between the second hologram image and the third hologram image are maintained to be greater than sizes of pupils of the observer in response to a pupil location change of the observer.

13. The holographic display apparatus of claim 9, wherein the first light source and the second light source are configured to simultaneously provide light to the spatial light modulator.

14. A holographic display apparatus comprising:
a spatial light modulator configured to generate hologram patterns to modulate incident light; and
an illuminator configured to emit light to the spatial light modulator, wherein the spatial light modulator is configured to simultaneously generate, from among the hologram patterns, a first hologram pattern that modulates the incident light as a first hologram image and a second hologram pattern that modulates the incident light as a second hologram image, wherein the holographic display apparatus is configured to set a first phase modulation value of the first hologram pattern and a second phase modulation value of the second hologram pattern to be different from each other such that a location difference between the first hologram image and the second hologram image is maintained to be greater than sizes of pupils of an observer observing the first hologram image and the second hologram image, and wherein the first hologram pattern is represented as a product of hologram data of the first hologram image multiplied with the first phase modulation value, and the second hologram pattern is represented as a product of hologram data of the second hologram image multiplied with the second phase modulation value.

15. The holographic display apparatus of claim 14, wherein the illuminator comprises one light source configured to emit light.

16. The holographic display apparatus of claim 15, wherein the holographic display apparatus is configured to set the first phase modulation value such that the first hologram image formed by modulating the light emitted by the light source by using the first hologram pattern is incident to a first viewing zone, and to set the second phase modulation value such that the second hologram image formed by modulating the light emitted by the light source by using the second hologram pattern is incident to a second viewing zone different from the first viewing zone.

17. The holographic display apparatus of claim 14, wherein the illuminator comprises a first light source configured to emit light for forming the first hologram image and a second light source configured to emit light for forming the second hologram image.

18. The holographic display apparatus of claim 17, wherein the holographic display apparatus is configured to set the first phase modulation value such that the first hologram image formed by modulating the light emitted by the first light source by using a first hologram pattern is incident to a first viewing zone, and a third hologram image formed by modulating the light emitted by the second light source by using the first hologram pattern is incident to a location beyond a second viewing zone.

19. The holographic display apparatus of claim 18, wherein the holographic display apparatus is configured to set the second phase modulation value such that the second hologram image formed by modulating the light emitted by the second light source by using the second hologram pattern is incident to the second viewing zone, and a fourth hologram image formed by modulating the light emitted by the first light source by using the second hologram pattern is incident to a location beyond the first viewing zone.

20. The holographic display apparatus of claim 19, wherein the holographic display apparatus is configured to set the first phase modulation value and the second phase modulation value such that a location difference between the first hologram image and the fourth hologram image and a location difference between the second hologram image and the third hologram image are maintained to be greater than sizes of the pupils of an observer.

21. A holographic display method comprising:
emitting light to a spatial light modulator; and
simultaneously forming, by the spatial light modulator, a first hologram pattern that modulates the light as a first hologram image and a second hologram pattern that modulates the light as a second hologram image, wherein the simultaneously forming comprises setting a first phase modulation value of the first hologram pattern and a second phase modulation value of the second hologram pattern to be different from each other such that a location difference between the first hologram image and the second hologram image is maintained to be greater than sizes of pupils of an observer observing the first hologram image and the second hologram image, and wherein the first hologram pattern is represented as a product of hologram data of the first hologram image multiplied with the first phase modulation value, and the second hologram pattern is represented as a product of hologram data of the second hologram image multiplied with the second phase modulation value.

22. The holographic display method of claim 21, wherein the emitting of the light to the spatial light modulator comprises emitting the light using one light source, and
wherein the simultaneously forming comprises setting the first phase modulation value such that the first hologram image formed by modulating the light emitted by the light source by using the first hologram pattern is incident to a first viewing zone, and setting the second phase modulation value such that the second hologram image formed by modulating the light emitted by the light source by using the second hologram pattern is incident to a second viewing zone different from the first viewing zone.

23. The holographic display method of claim 21, wherein the emitting of the light to the spatial light modulator comprises emitting the light using a first light source which emits light for forming the first hologram image and a second light source which emits light for forming the second hologram image, and
wherein the simultaneously forming comprises setting the first phase modulation value such that the first hologram image formed by modulating the light emitted by the first light source by using a first hologram pattern is incident to a first viewing zone, and a third hologram image formed by modulating the light emitted by the second light source by using the first hologram pattern is incident to a location beyond a second viewing zone.

24. The holographic display method of claim 23, wherein the simultaneously forming comprises setting the second phase modulation value such that the second hologram image formed by modulating the light emitted by the second light source by using the second hologram pattern is incident to the second viewing zone, and a fourth hologram image formed by modulating the light emitted by the first light source by using the second hologram pattern is incident to a location beyond the first viewing zone.

25. The holographic display method of claim 24, wherein the simultaneously forming comprises setting the first phase modulation value and the second phase modulation value such that a location difference between the first hologram image and the fourth hologram image and a location difference between the second hologram image and the third hologram image are maintained to be greater than sizes of the pupils of an observer.

* * * * *